United States Patent
Mannewitz et al.

(10) Patent No.: US 11,988,429 B2
(45) Date of Patent: May 21, 2024

(54) CONTROL UNIT FOR A REFRIGERANT COMPRESSOR

(71) Applicant: BITZER Kuehlmaschinenbau GmbH, Sindelfingen (DE)

(72) Inventors: Jens Mannewitz, Schkeuditz (DE); Tobias Fuhrer, Rottenburg a.N. (DE); Patrick Schneider, Herrenberg (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 105 days.

(21) Appl. No.: 17/372,072

(22) Filed: Jul. 9, 2021

(65) Prior Publication Data
US 2022/0018582 A1     Jan. 20, 2022

(30) Foreign Application Priority Data
Jul. 15, 2020   (DE) .......................... 102020118740.8

(51) Int. Cl.
F25B 49/02     (2006.01)

(52) U.S. Cl.
CPC .......... F25B 49/022 (2013.01); F25B 49/025 (2013.01); *F25B 2600/0253* (2013.01); *F25B 2700/171* (2013.01); *F25B 2700/21155* (2013.01); *F25B 2700/21156* (2013.01)

(58) Field of Classification Search
CPC ........ F25B 49/00; F25B 49/02; F25B 49/022; F25B 49/025; F25B 2600/0253; F25B 2700/171; F25B 2700/21155; F25B 2700/21156
See application file for complete search history.

(56) References Cited

U.S. PATENT DOCUMENTS

2005/0034469 A1   2/2005   Ochiai
2016/0298627 A1   10/2016  Knippen et al.

FOREIGN PATENT DOCUMENTS

| DE | 10392657 T5 | 8/2005 |
|---|---|---|
| EP | 2853742 A1 | 4/2015 |
| WO | WO 2013/001829 A1 | 1/2013 |

*Primary Examiner* — Jonathan Bradford
(74) *Attorney, Agent, or Firm* — Reinhart Boerner Van Deuren P.C.

(57) ABSTRACT

A refrigerant compressor for refrigeration plants having a compressor unit driven by a drive unit. At least one of the compressor and drive units has a control unit which is controllable by delivery rate control system to control the refrigerant compressor at different delivery rates. An external delivery rate setpoint value is communicated to the delivery rate control system to prevent critical operating states. The delivery rate control system is configured to acquire, via a sensor, a compressor unit reference temperature. The delivery rate control system is configured to ascertain an operating state value group to acquire an operating state of the refrigerant compressor, and specify a delivery rate for operation of the refrigerant compressor outside of the critical operating states, if the value of the ascertained operating state value group based upon the compressor reference temperature permits a critical operating state of the refrigerant compressor.

31 Claims, 13 Drawing Sheets

CONTROL UNIT FOR A REFRIGERANT COMPRESSOR

CROSS-REFERENCE TO RELATED PATENT APPLICATION

This patent application claims the benefit of German application No. 10 2020 118 740.8, filed Jul. 15, 2020, the teachings and disclosure of which are hereby incorporated in their entirety by reference thereto.

BACKGROUND OF THE INVENTION

The invention relates to a refrigerant compressor for refrigeration plants, comprising a compressor unit driven by a drive unit, at least one of these units being provided with a control unit which is controllable by means of a delivery rate control system in order to control the refrigerant compressor at different delivery rates, wherein an external delivery rate setpoint value is communicated to the delivery rate control system.

In refrigerant compressors of this type, the problem exists in the partial load region, in particular at low delivery rates, of preventing overheating of the refrigerant compressor, since at low delivery rates the cooling by the refrigerant to be compressed is too low.

The compressor units can be reciprocating piston compressors, screw compressors or scroll compressors.

This problem is solved according to the invention in a refrigerant compressor of the type mentioned in the introduction in that the delivery rate control system acquires, by means of a sensor, a compressor reference temperature of the compressor unit, in that the delivery rate control system ascertains an operating state value group for acquisition of an operating state of the refrigerant compressor on the basis at least of the acquired compressor reference temperature or the delivery rate and, taking account of specified reference values for differentiating between operating states that are non-critical and critical for the refrigerant compressor, if the value of the ascertained operating state value group based upon the compressor reference temperature permits a critical operating state of the refrigerant compressor, specifies a delivery rate which has as its result an operation of the refrigerant compressor outside of the critical operating states.

SUMMARY OF THE INVENTION

The advantage of the solution according to the invention lies in that the possibility thus also exists of operating the refrigerant compressor according to the invention in partial load states, in particular at low delivery rates without any risk of overheating the refrigerant compressor, and thus a reduction of the delivery rate of the refrigerant compressor is possible without harm, since the delivery rate control system intervenes when a critical operating state is reached.

An advantageous solution provides that the delivery rate control system ascertains the operating state value group based upon the acquired compressor reference temperature and the delivery rate.

In the context of the fundamental definition of the solution according to the invention, it has not been considered in detail how the delivery rate control system evaluates the acquired delivery rate when ascertaining the operating state value group and, where relevant, takes it into account.

An advantageous solution thus provides that, when ascertaining the values of the operating state value group of the refrigerant compressor, the delivery rate control system ascertains a mean value of the delivery rate over a defined acquisition period.

It can thus be precluded that short-term variations of the delivery rate influence the control of the refrigerant compressor.

The possibility also exists to take into account the inertia of the temperature behavior of the refrigerant compressor, since it typically does not overheat suddenly but rather an overheating of the refrigerant compressor develops over an extended period of, for example, a plurality of, or many minutes.

It is particularly favorable if the acquisition period is in the range from one minute to 30 minutes, which means that the acquisition period is at least one minute and not more than 30 minutes.

Furthermore, it is advantageously provided that the delivery rate control system ascertains a mean value of the compressor reference temperature over a defined acquisition period when ascertaining the values of the operating state value group, also in order to ignore short-term oscillations of the compressor reference temperature.

This defined acquisition period preferably lies in the range from 30 seconds to 15 minutes.

Advantageously, the acquisition period for the mean value of the compressor reference temperature is shorter than the acquisition period for the mean value of the delivery rate.

As the compressor reference temperature, in the context of the solution according to the invention, for example, the acquisition of a compressed gas temperature on the high pressure side of the compressor unit and/or an oil temperature of the compressor unit and/or a temperature of the drive unit is provided.

With regard to the manner of ascertaining the delivery rate, a great variety of different possibilities are conceivable.

An advantageous solution provides that for ascertaining the operating state value group, the delivery rate control system acquires the delivery rate based upon control signals for at least one of the units.

This means that the control system is therefore capable, on the basis of the control signals generated by it and storing said signals, of ascertaining the delivery rate at the respective time point.

Moreover, with regard to the preceding description of the solution according to the invention, it has not been considered in detail how the delivery rate to be specified by the delivery rate control system is to be ascertained in detail.

Thus, an advantageous solution provides that, on determination of the delivery rate to be specified, the delivery rate control system takes account of the value, based upon the acquired delivery rate, of the operating state value group in relation to the reference values.

This is to be understood to mean that the delivery rate control system directly compares this value of the operating state value group with one or more of the reference values and/or includes it in a calculation process making use of the reference values.

A simplified solution provides that the delivery rate control system compares the value of the operating state value group based upon the acquired delivery rate with the reference values.

The comparison with the reference values can be used, firstly, to recognize a critical or non-critical operating state.

Secondly, the comparison with the reference values can also be used, for example, in the case of a critical operating state, to use the reference value for the delivery rate that is to be specified.

An advantageous solution provides, for example, that for ascertaining the delivery rate to be specified, the delivery rate control system uses at least one value for the delivery rate that is specified by means of the reference values, said value lying outside of the critical operating states.

Alternatively or in addition thereto, a further advantageous solution provides that the delivery rate control system specifies the delivery rate such that an averaging of the delivery rate over an operating averaging period yields a total delivery rate that lies outside of the critical operating states.

With regard to the formation and configuration of the reference values, no further details have yet been provided.

An advantageous solution provides that the reference values comprise at least one limit value for the delivery rate which defines a limit to the critical operating states.

Particularly favorably, the reference values can be taken into account if a limit function representing the reference values is specified to the delivery rate control system, said limit function defining the boundary between the non-critical and critical operating states.

A particularly favorable realization of the solution according to the invention provides that the delivery rate control system specifies the delivery rate so that it corresponds at least to the value of the limit function representing the delivery rate at the value of the operating state value group based upon the compressor reference temperature.

In this case, it is conceivable, for example, to make use of the value of the limit function representing the delivery rate at the corresponding compressor reference temperature for the specification of the delivery rate without, for example, carrying out a comparison between the value of the operating state value group, based upon the delivery rate, and the limit function.

For the determination of the delivery rate that is to be specified, it is, however, advantageous with regard to a specification of the delivery rate that is as free as possible from short-term variations if, in the determination of the delivery rate to be specified, the relevant value of the limit function at the value of the operating state value group based upon the compressor reference temperature is only used when the value of the operating state value group based upon the delivery rate lies in the range of critical operating states, that is for example, below the respective value of the limit function.

By this means, it can be achieved that the delivery rate does not reach any critical operating states.

A further advantageous solution provides that the delivery rate control system specifies the delivery rate such that an averaging of the delivery rate over an operating averaging period achieves at least the respective value of the limit function.

With regard to the operating averaging period, no further details have yet been provided.

It is preferably provided that the operating averaging period for averaging the delivery rate comprises the acquisition period for the value of the operating state value group that is based upon the delivery rate.

It is conceivable, in principle, to dimension the operating averaging period so that it comprises only the acquisition period for the mean value of the delivery rate.

It is still more advantageous if the operating averaging period is greater than the acquisition period for the value of the operating state value group that is based upon the delivery rate.

In particular, it is advantageous if the operating averaging period also comprises a future period in order thus to have the possibility of taking account of preemptive, self-setting values of the delivery rate and therefore of preventing a severe overswing during the setting of the delivery rate.

With regard to the exemplary embodiments described so far, it has not been defined in detail how the specification of the delivery rate is to take place.

An advantageous solution provides that the delivery rate control system for setting the delivery rate generates an internal delivery rate setpoint value and takes account thereof for the determination of the delivery rate.

In the simplest case, this takes place in that the delivery rate control system makes use, as the internal delivery rate setpoint value, of at least the value for the delivery rate corresponding to the value based upon the compressor reference temperature and specified by the limit function.

This means that at least the value of the limit function corresponding to the respective delivery rate at the respective compressor reference temperature serves as the delivery rate setpoint value that is taken into account, in particular, for the specification of the future delivery rate.

In particular, future delivery rates can be taken into account in that the delivery rate control system ascertains the internal delivery rate setpoint value taking account of an averaging over future delivery rates corresponding to this internal delivery rate setpoint value within the operating averaging period.

It is thereby advantageously provided, in particular, that the internal delivery rate setpoint value is determined such that the future delivery rates corresponding thereto, in conjunction with the value of the operating state value group based upon the delivery rate, yields a mean total delivery rate which corresponds to the limit value for the total delivery rate specified by the limit function at the value of the operating state value group based upon the compressor reference temperature.

Thereby, at the internal delivery rate setpoint value, the future delivery rates can be regarded as momentary values.

It is particularly favorable if the future delivery rates corresponding to the internal delivery rate setpoint value are averaged over a future acquisition period.

Thus, firstly for the determination of the internal delivery rate setpoint value, an averaging takes place over the delivery rates in the past and also an averaging over the future delivery rates corresponding to the delivery rate setpoint value to be ascertained in order thereby, taking account of the delivery rates in the past and the delivery rates in the future corresponding to the internal delivery rate setpoint value, to form a mean value over the operating averaging period, said mean value thus taking account of the delivery rates from the past and also the future delivery rates, so that thereby, in particular, severe oscillations in the delivery rate to be specified are prevented.

It is particularly favorable if the operating averaging period is made up from the past acquisition period for the mean delivery rate and the future acquisition period for the averaging over the future delivery rates.

With regard to the description of the invention so far, it has not been considered in detail to what extent the delivery rate control system takes account during the control of the delivery rate, of the internally ascertained delivery rate setpoint value or the externally specified delivery rate setpoint value.

An advantageous solution provides that the delivery rate control system for controlling the delivery rate takes account of the internally ascertained delivery rate setpoint value for as long as the externally specified delivery rate setpoint value lies below the internally ascertained delivery rate setpoint value, so that the internally ascertained delivery rate setpoint value always represents a minimum condition for the delivery rate to be specified and thus the externally specified delivery rate setpoint value is only taken into account if it is higher than the internal delivery rate setpoint value.

In the simplest case, this can be achieved in that the delivery rate control system compares the internally ascertained delivery rate setpoint value and the externally specified delivery rate setpoint value with one another and takes the larger of the delivery rate setpoint values into account for controlling the delivery rate.

In order to convey to the system operator and/or the plant control system whether the delivery rate is determined by the internal or the external delivery rate setpoint value, it is preferably provided that the delivery rate control system generates a signal if the refrigerant compressor is operated with an internally ascertained delivery rate setpoint value.

Advantageously, it is also provided that the delivery rate control system generates an information signal if the delivery rate is determined by the external delivery rate setpoint value.

A further advantageous solution provides that an advance warning range in which non-critical operating states exist which adjoin the specified limit function is specified to the delivery rate control system.

By this means, the possibility exists for indicating to a plant operator or the higher-level plant control system that a probability exists for a departure from the non-critical operating states, so that the delivery rate control system will possibly engage in the manner described above.

It is particularly favorable therein if the delivery rate control system generates an advance warning signal if operating state value groups that lie within the advance warning range are recognized.

A further advantageous embodiment provides that the delivery rate control system additionally or alternatively to controlling the delivery rate, drives a fan and/or a refrigerant injection device for cooling the refrigerant compressor.

In particular, the driving of the fan or the refrigerant injection device can take place by means of the advance warning signal indicating an advance warning range.

The description above of solutions according to the invention thus comprises, in particular, the different feature combinations defined by the following sequentially numbered embodiments:

1. Refrigerant compressor (10) for refrigeration plants comprising a compressor unit (40) driven by a drive unit (60), at least one of these units (60, 40) being provided with a control unit (140, 70) which is controllable by means of a delivery rate control system (130) in order to control the refrigerant compressor (10) at different delivery rates (FV), wherein an external delivery rate setpoint value (EFVS) is communicated to the delivery rate control system (130), wherein the delivery rate control system (130) acquires, by means of a sensor (152), a compressor reference temperature (RT) of the compressor unit (40), in that the delivery rate control system (130) ascertains an operating state value group (BZW) for acquisition of an operating state of the refrigerant compressor (10) on the basis at least of the acquired compressor reference temperature (RT) or the delivery rate (FV) and, taking account of specified reference values (GF) for differentiating between operating states that are non-critical (UB) and critical (KB) for the refrigerant compressor (10), if the value of the ascertained operating state value group (BZW) based upon the compressor reference temperature (RT) permits a critical operating state of the refrigerant compressor (10), specifies a delivery rate (FV) which has as its result an operation of the refrigerant compressor (10) outside of the critical operating states (KB).

2. Refrigerant compressor according to embodiment 1, wherein the delivery rate control system (130) ascertains the operating state value group (BZW) based upon the acquired compressor reference temperature (RT) and the delivery rate (FV).

3. Refrigerant compressor according to embodiment 1 or 2, wherein when ascertaining the values of the operating state value group (BZW) of the refrigerant compressor (10), the delivery rate control system (130) ascertains a mean value of the delivery rate (MFV) over a defined acquisition period ($t_1$).

4. Refrigerant compressor according to embodiment 3, wherein the defined acquisition period is in the range from one minute to 30 minutes.

5. Refrigerant compressor according to one of the preceding embodiments, wherein when ascertaining the values of the operating state value group (BZW), the delivery rate control system (130) ascertains a mean value of the compressor reference temperature (MRT) over a defined acquisition period.

6. Refrigerant compressor according to embodiment 5, wherein the defined acquisition period is in the range from 30 seconds to 15 minutes.

7. Refrigerant compressor according to one of the preceding embodiments, wherein the delivery rate control system (130) takes into account as the compressor reference temperature (RT) at least one of the temperatures such as the compressed gas temperature on the high pressure side of the compressor unit, the oil temperature of the compressor unit and the temperature of the drive unit.

8. Refrigerant compressor according to one of the preceding embodiments, wherein for ascertaining the values of the operating state value group (BZW), the delivery rate control system (130) acquires the delivery rate (FV) on the basis of control signals (SSM, SSE) for at least one of the units (60, 40).

9. Refrigerant compressor according to one of the preceding embodiments, wherein during the determination of the delivery rate (FV) to be specified, the delivery rate control system (130) takes account of the value, on the basis of the acquired delivery rate (FV), of the operating state value group (BZW) in relation to the reference values (GF).

10. Refrigerant compressor according to embodiment 9, wherein the delivery rate control system (130) compares the value, on the basis of the acquired delivery rate (FV), of the operating state value group (BZW) with the reference values (GF).

11. Refrigerant compressor according to one of the preceding embodiments, wherein for ascertaining the delivery rate (FV) to be specified, the delivery rate control system (130) uses at least one value (GFV, MFV) for the delivery rate that is specified by means of the reference values, which lies outside of the critical operating states (KB).

12. Refrigerant compressor according to one of the preceding embodiments, wherein the delivery rate control system (130) specifies the delivery rate (FV) such that an averaging of the delivery rate (FV) over an operating averaging period ($t_1+t_2$; $t_1$) yields a total delivery rate (GFV) that lies outside of the critical operating states (KB).

13. Refrigerant compressor according to one of the preceding embodiments, wherein the reference values comprise at least one limit value (GF) for the delivery rate (FV) which defines a limit to the critical operating states (KB).

14. Refrigerant compressor according to one of the preceding embodiments, wherein a limit function (GF) representing the reference values which defines the boundary between the non-critical (UB) and critical (KB) operating states is specified to the delivery rate control system (130).

15. Refrigerant compressor according to one of the preceding embodiments, wherein the delivery rate control system (130) specifies the delivery rate (FV) such that it corresponds to at least the respective value (MFV (GV)) of the limit function (GF) at the value of the operating state value group (BZW) based upon the compressor reference temperature (MRT).

16. Refrigerant compressor according to one of the preceding embodiments, wherein the delivery rate control system (130) specifies the delivery rate (FV) such that an averaging of the delivery rate (FV) over an operating averaging period ($t_1+t_2$; $t_1$) achieves at least the respective value of the limit function (GF).

17. Refrigerant compressor according to one of the preceding embodiments, wherein the operating averaging period ($t_1+t_2$; $t_1$) comprises the acquisition period ($t_1$) for the value of the operating state value group (BZW) based upon the acquired delivery rate (FV).

18. Refrigerant compressor according to embodiment 14 or 15, wherein the operating averaging period ($t_1+t_2$; $t_1$) is greater than the acquisition period ($t_1$) for the value of the operating state value group (BZW) based upon the delivery rate (FV).

19. Refrigerant compressor according to one of the embodiments 16 to 18, wherein the operating averaging period ($t_1+t_2$) also comprises a future period ($t_2$).

20. Refrigerant compressor according to one of the preceding embodiments, wherein for ascertaining the delivery rate (FV), the delivery rate control system (130) generates an internal delivery rate setpoint value (IFVS) and takes account thereof for the determination of the delivery rate (FV).

21. Refrigerant compressor according to embodiment 20, wherein the delivery rate control system (130) makes use, as the internal delivery rate setpoint value (IFVS), of at least the value for the delivery rate (MFV) corresponding to the value (MRT) based upon the compressor reference temperature (RT) and specified by the limit function (GF).

22. Refrigerant compressor according to embodiment 20 or 21, wherein the delivery rate control system (130) ascertains the internal delivery rate setpoint value (IFVS) taking account of an averaging over future delivery rates (FV) corresponding to this internal delivery rate setpoint value (IFVS) within the operating averaging period ($t_1+t_2$).

23. Refrigerant compressor according to one of the embodiments 20 to 22, wherein the internal delivery rate setpoint value (IFVS) is determined such that the future delivery rates (FV) corresponding thereto in conjunction with the value (MFV) of the operating state value group (BZW) based upon the delivery rate (FV) yields a mean total delivery rate (GFV) which corresponds to the limit value (GFV (GF)), specified at the mean compressor reference temperature (MRT) by the limit function (GF), for the total delivery rate (GFV).

24. Refrigerant compressor according to embodiment 23, wherein the future delivery rates (FV) corresponding to the internal delivery rate setpoint value (IFVS) are averaged over a future acquisition period ($t_2$).

25. Refrigerant compressor according to one of the embodiments 16 to 24, wherein the operating averaging period ($t_1+t_2$) is composed of the past acquisition period ($t_1$) for the value of the operating state value group (BZW) based upon the delivery rate (MFV) and the future acquisition period ($t_2$) for averaging the future delivery rates (FV).

26. Refrigerant compressor according to one of the preceding embodiments, wherein for the specification of the delivery rate (FV), the delivery rate control system (130) takes account of the internally ascertained delivery rate setpoint value (IFVS) for as long as the externally specified delivery rate setpoint value (EFVS) is below the internally ascertained delivery rate setpoint value (IFVS).

27. Refrigerant compressor according to one of the preceding embodiments, wherein the delivery rate control system (130) compares the internally ascertained delivery rate setpoint value (IVFS) and the externally specified delivery rate setpoint value (EVFS) with one another and takes the larger of the delivery rate setpoint values (IVFS, EVFS) into account for controlling the delivery rate (FV).

28. Refrigerant compressor according to one of the preceding embodiments, wherein the delivery rate control system (130) generates a signal (WS) if the refrigerant compressor (10) is operated with an internally ascertained delivery rate setpoint value (IFVS).

29. Refrigerant compressor according to one of the preceding embodiments, wherein the delivery rate control system (130) generates an information signal (IS) if the delivery rate (FV) is determined by the external delivery rate setpoint value (EFVS).

30. Refrigerant compressor according to one of the preceding embodiments, wherein an advance warning range (VWB) in which non-critical operating states (UB) exist which adjoin the specified limit function (GF) is specified to the delivery rate control system (130).

31. Refrigerant compressor according to one of the preceding embodiments, wherein the delivery rate control system (130) generates an advance warning signal (VWS) if operating state value groups (BZW) that lie within the advance warning range (VWB) are recognized.

32. Refrigerant compressor according to one of the preceding embodiments, wherein the delivery rate control system (130) drives a fan (202) and/or a refrigerant injection device (204) for cooling the refrigerant compressor (10).

Further features and advantages of the invention are the subject matter of the following description and of the illustration in the drawings of some exemplary embodiments.

DETAILED DESCRIPTION OF THE INVENTION

Figure 1:
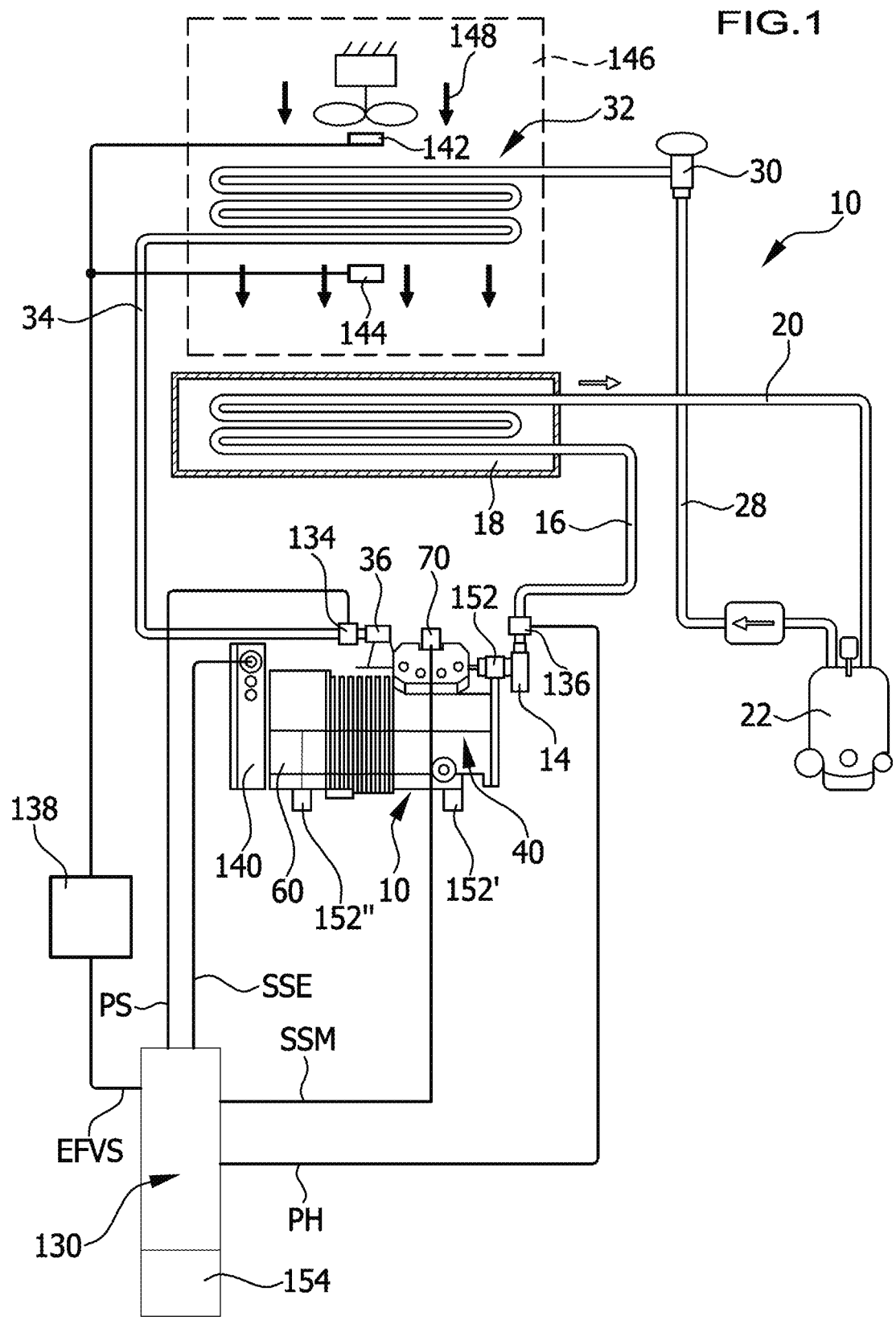
FIG. 1 is a schematic representation of a refrigeration plant according to the invention.

An exemplary embodiment of the refrigeration plant according to the invention comprises a refrigerant compressor 10 from the high pressure connector 14 of which, a line 16 leads to a heat exchanger identified overall as 18 in which the compressed refrigerant is condensed through the removal of heat to a heat sink, for example, circulated ambient air or other cooling media.

From the high pressure-side heat exchanger 18, liquid refrigerant flows in a line 20 to a collector 22 in which the liquid refrigerant collects and from which it then flows via a line 28 to an expansion element 30 for a low pressure-side heat exchanger 32 and absorbs heat, for example, from a gaseous medium flowing therethrough.

After flowing through the low pressure-side heat exchanger 32, the evaporated refrigerant flows via a line 34 to a low pressure connector 36 of the refrigerant compressor 10.

Figure 2:
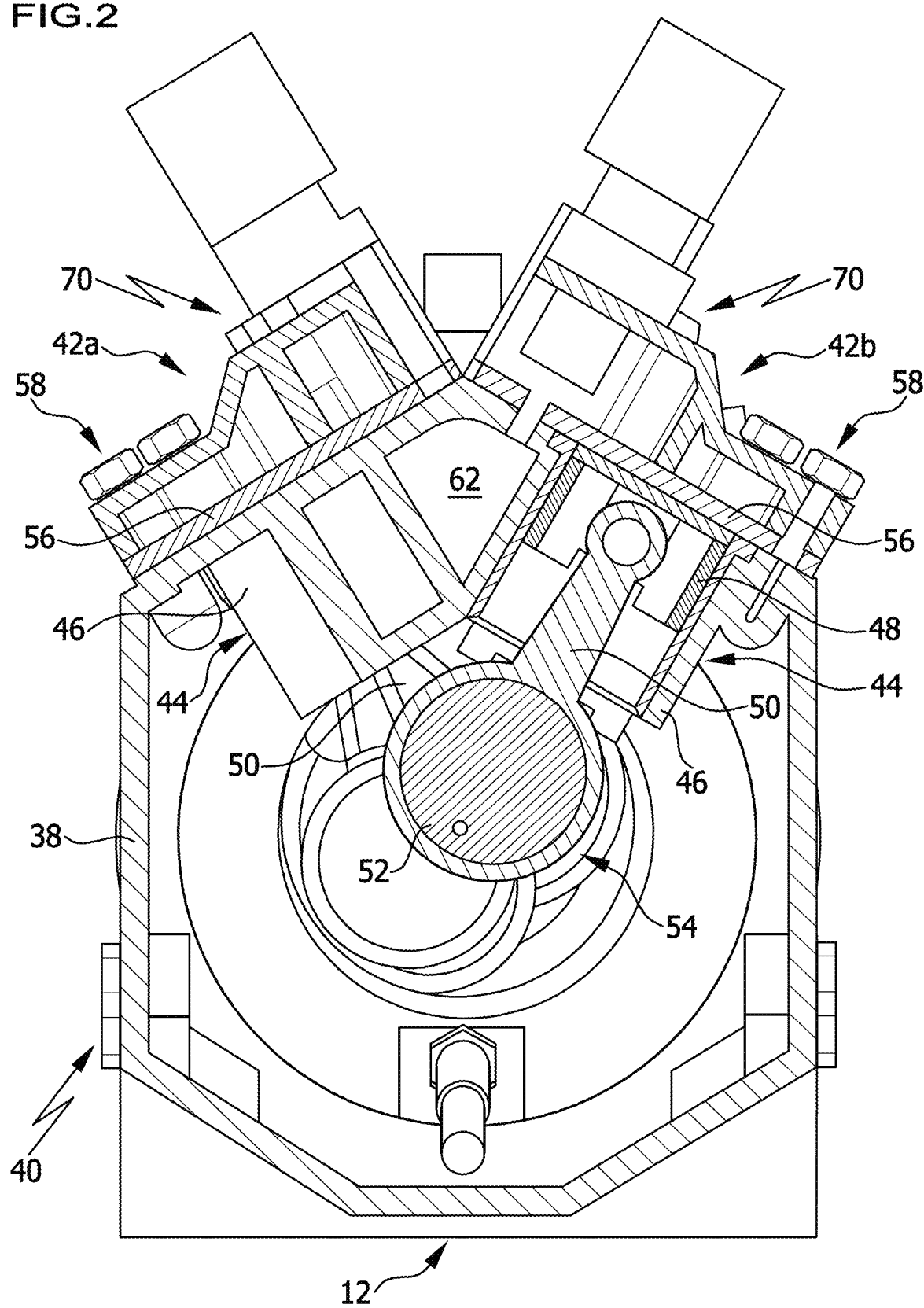
FIG. 2 is a transverse section along the line 2-2 through a refrigerant compressor of the refrigeration plant according to the invention.

As FIG. 2 shows, the refrigerant compressor 10 according to the invention has, for example, a reciprocating piston compressor as the compressor unit 40, comprising a compressor housing 38 in which, for example, two cylinder banks 42a and 42b are provided, operating in parallel and arranged in a V-shape, each of said banks comprising at least one, in particular, two or more cylinder units 44.

Each of these cylinder units 44 is formed from a cylinder housing 46 in which a piston 48 is movable reciprocatingly in that the piston 48 is drivable by means of a connecting rod 50 which itself is attached to an eccentric 52 of an eccentric shaft 54 or is driven by a crankshaft which is driven, in the refrigerant compressor 12 according to the invention, by a drive unit 60 configured as an electric motor, wherein the electric motor can be configured as a synchronous or an asynchronous motor.

The cylinder housing 46 of each of the cylinder units 44 is closed by a valve plate 56 on which a cylinder head 58 is arranged.

Preferably, the valve plate 56 covers not only a cylinder housing 46 of a cylinder unit 44, but all the cylinder housings 46 of the respective cylinder bank 42 and, in the same way, the cylinder head 58 also extends over the cylinder head 58 of all the cylinder housings 46 of the respective cylinder bank 42.

The compressor housing 38 further comprises an inlet channel 62 which is connected to the low pressure connector 36 and is integrated, for example, in the compressor housing 40.

Figure 3:
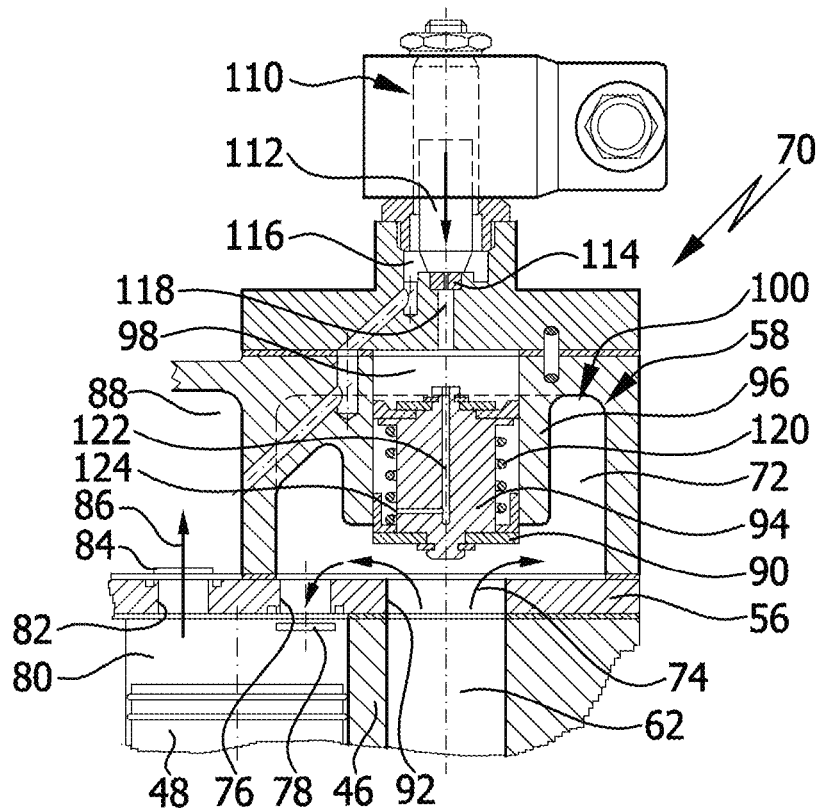
FIG. 3 is a section through a mechanical delivery rate control unit integrated into a cylinder head in the opened position of a valve body of the mechanical delivery rate control unit.

As shown enlarged in FIG. 3, associated with at least one cylinder bank 42, in the drawing each cylinder bank 42, is a mechanical control unit identified as a whole as 70, which serves to admit an inlet stream 74 of refrigerant passing through the valve plate 56 from the inlet channel 62 into the respective cylinder head 58, specifically into an inlet chamber 72 thereof in order thus to activate the respective cylinder bank 42, or to interrupt said inlet stream in order thus to deactivate the respective cylinder bank 42 and to control the delivery rate FV that is to be specified.

If the mechanical control unit 70 is opened—as shown in FIG. 3—the inlet stream 74 has the possibility to enter via an inlet opening 76 provided in the valve plate 56 and an inlet valve 78 provided on the valve plate 56 into a cylinder chamber 80 delimited by the respective piston 48 and the respective cylinder housing 46 as well as the valve plate 56, in order to be compressed therein by the reciprocating movement of the piston 48, so that an outlet stream 86 emerges from the cylinder chamber 80 via an outlet opening 82 and an outlet valve 84 and enters into an outlet chamber 88 of the cylinder head 58.

The mechanical control unit 70 is configured, for example, as a servo valve which is integrated in the cylinder head 58 and has a valve body 90 with which an inflow opening 92 of the inlet chamber 72 provided in the valve plate 56 is closable.

The valve body 90 is further arranged on a switching piston 94 which is guided in a switching cylinder housing 96 so that the switching piston 94 is movable in the direction of the valve plate 56 by a pressure present in a switching cylinder chamber 98 in order to close the inflow opening 92 therein.

A switching cylinder unit 100, formed from the cylinder housing 96, the switching piston 94 and the switching cylinder chamber 98, which is integrated into the cylinder head 58 is controllable therein by means of a control valve 110 which comprises an electromagnetically movable control piston 112 with which a control valve seating 114 is closable, wherein the control piston 112 and the control valve seat 114 are provided to interrupt or uncover a connection between a high pressure channel 116 leading to the outlet chamber 88 and a pressure feed channel 118 for the switching cylinder 100.

Figure 4:
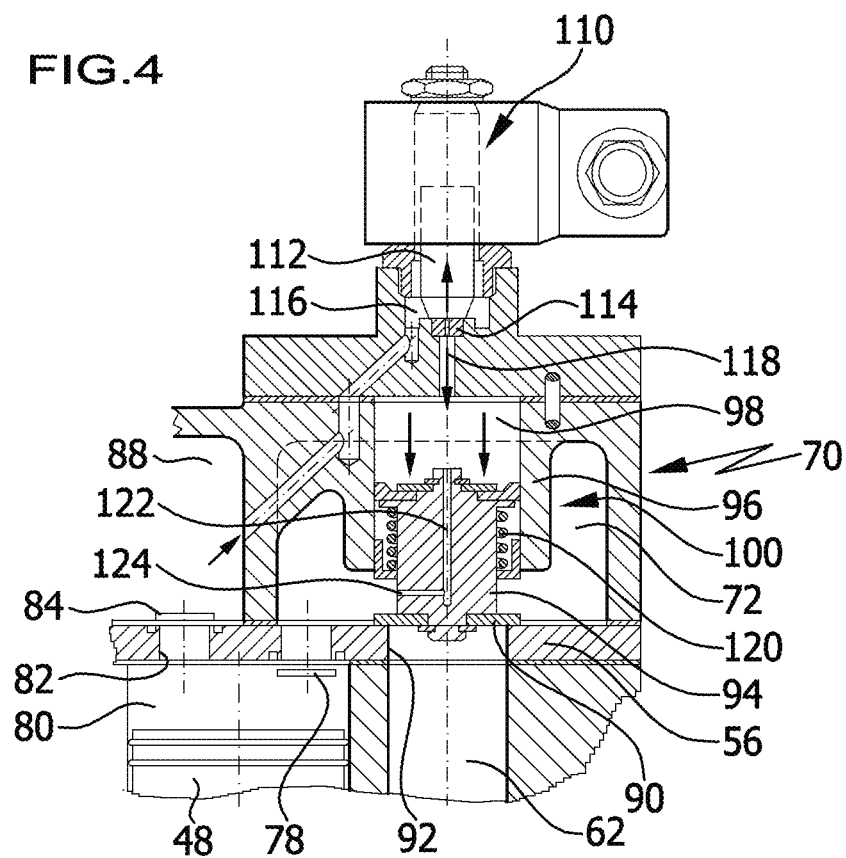
FIG. 4 is a section similar to FIG. 3 in a closed position of the valve body of the mechanical delivery rate control unit.
Figure 5:
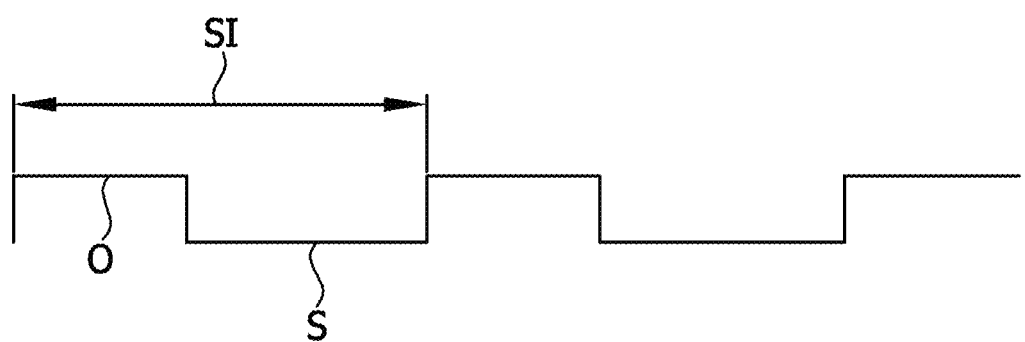
FIG. 5 is a schematic representation of a switching interval comprising an opening interval and a closing interval.

If the connection between the high pressure channel 116 and the pressure feed channel 118 is uncovered, the switching cylinder chamber 98 is exposed to the high pressure prevailing in the outlet chamber 88 and consequently the switching piston 94 moves in the direction of the valve plate 56 and presses the valve body 90 thereagainst in order to close the inflow opening 92 in the valve plate 56 (FIG. 4).

Thereby, the force acting on the switching piston 94 due to the high pressure in the switching cylinder chamber 98 counteracts the force of an elastic energy store 120 which, on one side, is supported against the switching cylinder housing 96 and, on the other side, acts upon the switching piston 94 such that said switching piston moves away from the valve plate 56 and thus moves the valve body 90 into a position uncovering the inflow opening 92.

In particular, the switching piston 94 is provided with a pressure relief channel 122 which extends from an opening facing the switching cylinder chamber 98 to an outlet opening 124 shown in FIG. 4, said outlet opening, in the position of the valve body 90 and the switching piston 94 closing the inflow opening 92, opening into the inlet chamber 72. The pressure relief channel 124 has the effect thereby that, on an interruption of the connection between the high pressure channel 116 and the pressure feed channel 118, the pressure in the switching cylinder chamber 98 rapidly collapses and thus the switching piston 94 together with the valve body 90 move under the effect of the elastic energy store 120 into a position shown in FIG. 3, uncovering the inflow opening 92.

The mechanical control unit 70 is controllable by a delivery rate control system 130 shown in FIG. 1 by means of control signals SSM, whereby the mechanical control unit 70 can be closed or opened in order to activate or deactivate the respective cylinder bank 42a, 42b and thus to put the refrigerant compressor 12 into an operating mode defining the scope of the activation and deactivation of the cylinder banks 42.

In addition, with the delivery rate control system 130, the drive motor 60 is also controllable via control signals SSE by means of a control unit 140 which is configured, in particular, as a frequency converter for the electric motor 60 in order to be able to operate it at variable rotary speed and thereby also, alternatively or in addition to the mechanical control units 70, to be able to control the delivery rate FV that is to be specified.

Furthermore, the delivery rate control system 130 has the possibility of acquiring the respective delivery rate FV of the refrigerant compressor 10, for example, by means of the control signals SSM.

Additionally, the delivery rate FV to be specified can be acquired, insofar as it is influenced by the frequency converter 140, by means of the electrical power consumed by the electric motor 60 or by the control signals SSE.

In addition, an external delivery rate setpoint value EFVS which is generated by a plant control system 138 is also specified to the delivery rate control system 130, said plant control system acquiring the cooling power required at the low pressure-side heat exchanger 32 for cooling an object 146, for example, a cooling chamber, for example, by means of temperature sensors 142 and 144 associated with the low pressure-side heat exchanger 32, which enable it to acquire the temperatures of a medium 148 flowing through the low pressure-side heat exchanger 32 and the object 146, for example, before and after the low pressure-side heat exchanger 32, and to compare them with a required temperature of the medium 146.

In one control step, through the generation of suitable control signals SSM and SSE, the delivery rate control system 130 adapts the cooling power of the refrigeration plant 10 to the cooling power required for the cooling of the object 146 through the selection of a suitable operation of the compressor unit 10 by means of the control unit 70 and/or by means of a possible regulation of the rotary speed of the electric motor 60 by means of the frequency converter 140, wherein as the basis for this adaptation, the external delivery rate setpoint value EFVS generated by the plant control system 138 is utilized.

In particular, however, for the adaptation of the rotary speed, due to the construction of the electric motor 60, only a restricted rotary speed range is available, which is also to be taken into account in the selection of the suitable operation.

The operation possible in partial load states can provide, for example, an operation of the refrigerant compressor 10 with all the cylinder banks 42 in the active state with or without an adaptation to the partial load state by adaptation of the rotary speed of the electric motor 12 by the frequency converter 132, an operation of the refrigerant compressor 10 with active and inactive cylinder banks 42, with or without an adaptation of the rotary speed of the electric motor 12 by the frequency converter 132 to the capacity of the active and inactive cylinder banks, an operation of the refrigerant compressor 10 with just one active cylinder bank 42 and an adaptation to the partial load state by adaptation of the rotary speed of the electric motor 12 by the frequency converter.

The activation or deactivation of at least one of the cylinder banks 42a, 42b can take place, for example, in a first mode of operation, over the entire period of the respective partial load state, so that for example, during a particular period in which a partial load state of X % of the full load state is required, one cylinder bank 42 is constantly deactivated and the refrigerant compressor 12 functions with the respective other active cylinder bank 42, and possibly also a corresponding adaptation of the rotary speed of the electric motor takes place through corresponding control of the frequency converter 132.

Alternatively thereto, however, it is also possible in a second type of operation to activate or deactivate at least one cylinder bank 42a, 42b or both cylinder banks 42 in a clocked manner during the period of a partial load state and/or possibly also to adapt the rotary speed of the electric motor 60 in a suitable manner by controlling the frequency converter 132.

For this purpose, the mechanical control unit 70 is controllable by the delivery rate control system 130 shown in FIG. 1 such that thereby in continuously successive switching intervals SI, the mechanical control unit 70 closes and opens, whereby each of the switching intervals SI has an opening interval O in which the valve body 90 in its uncovering position permits a passage of the inlet stream 74 through the inflow opening 92 and activates the corresponding cylinder bank 42, and also has a closing interval S in which the valve body 90, as shown in FIG. 4, in its closing position blocks the passage of the inlet stream 74 through the inflow opening 92 and thus deactivates the corresponding cylinder bank 42.

Within the duration of the respective switching interval SI, the duration of the opening interval O and of the closing interval S relative to one another can be variably set so that either the opening interval O is greater than the closing interval or vice versa.

In an extreme case, the opening interval O can extend substantially over the whole duration of the switching interval SI, whereas the closing interval S becomes as small as desired or, conversely, the closing interval S can extend substantially over the entire duration of the switching interval SI, so that the opening interval O becomes as small as desired.

Figure 6:
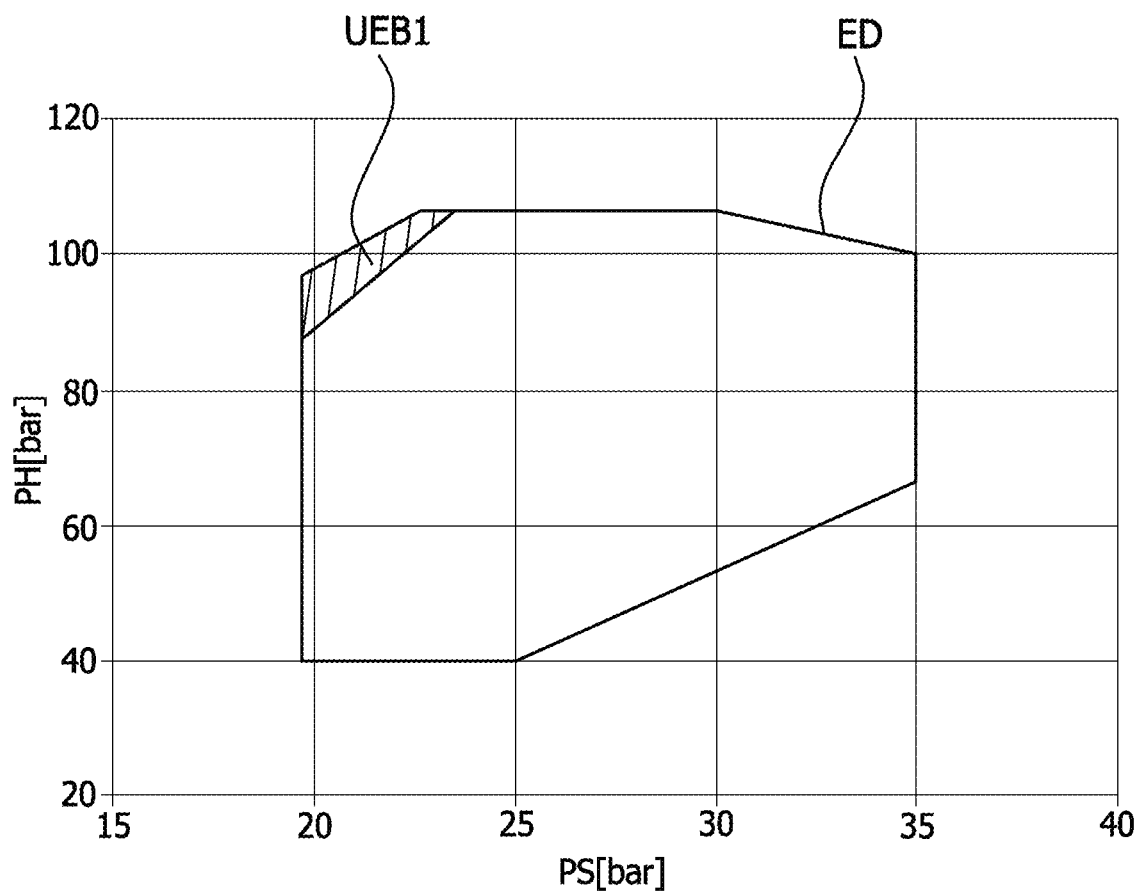
FIG. 6 is a schematic representation of an operating diagram.
Figure 7:
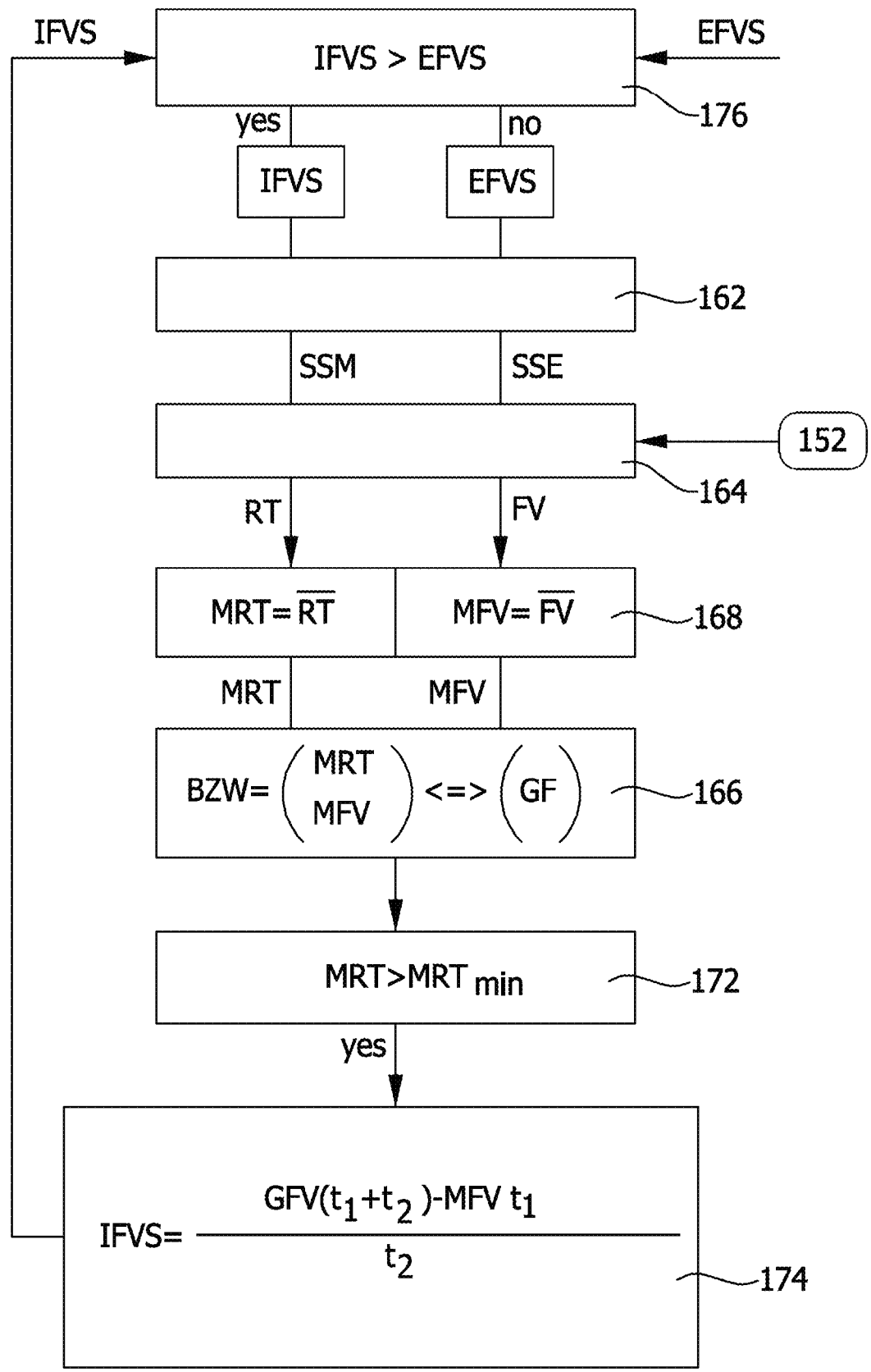
FIG. 7 is a flow diagram of a first exemplary embodiment to illustrate the procedure according to the invention.

The delivery rate control system 130 according to the invention operates the refrigerant compressor 10, in principle, within the operating diagram ED, shown in FIG. 6, which illustrates an example of an operating diagram ED for a compressor and which indicates the relationship of the values of the suction pressure PS and the high pressure PH permissible for a specific refrigerant compressor 10, wherein in the control step identified in FIG. 7 with 162, the control signals SSM and/or SSE are generated based upon one of two delivery rate setpoint values, specifically the external delivery rate setpoint value EFVS and an internal delivery rate setpoint value IFVS to be described in greater detail below.

However, the operating diagram ED does not take into account that, in particular, with a reduced delivery rate FV in the operating diagram ED, an overheating can occur, for example, in the regions UEB1 of the operating diagram ED, shown shaded in FIG. 6, since at a reduced delivery rate FV over a relatively long period, due to the reduced throughflow of the medium to be compressed, said medium also having a cooling function, an inadmissible heating occurs in the compressor unit 40, so that an overheating not only of the compressor unit 40, but also of the entire refrigerant compressor 10 can occur, leading to damage, although the refrigerant compressor 10 is operated within the limits specified by the operating diagram ED.

For this reason, in the solution according to the invention, an acquisition of a compressor reference temperature RT by the delivery rate control system 130 takes place by means of a sensor 152, in particular a temperature sensor which is arranged, for example, in the region of the high pressure connector 14.

However, alternatively or additionally, an oil temperature of the compressor unit (40), acquired by means of a sensor 152' and/or a temperature of the drive unit acquired by means of a sensor 152" can be used as the compressor reference temperature RT.

Furthermore, in an acquisition step 164, the delivery rate control system 130 acquires the delivery rate FV of the refrigerant compressor 10, for example, by acquisition of the generated control signals SSM and/or SSE, wherein the delivery rate FV corresponds, for example, without additional measures, as described below, of the delivery rate control system 130, to one of the delivery rate setpoint values IFVS or EFVS.

Figure 8:
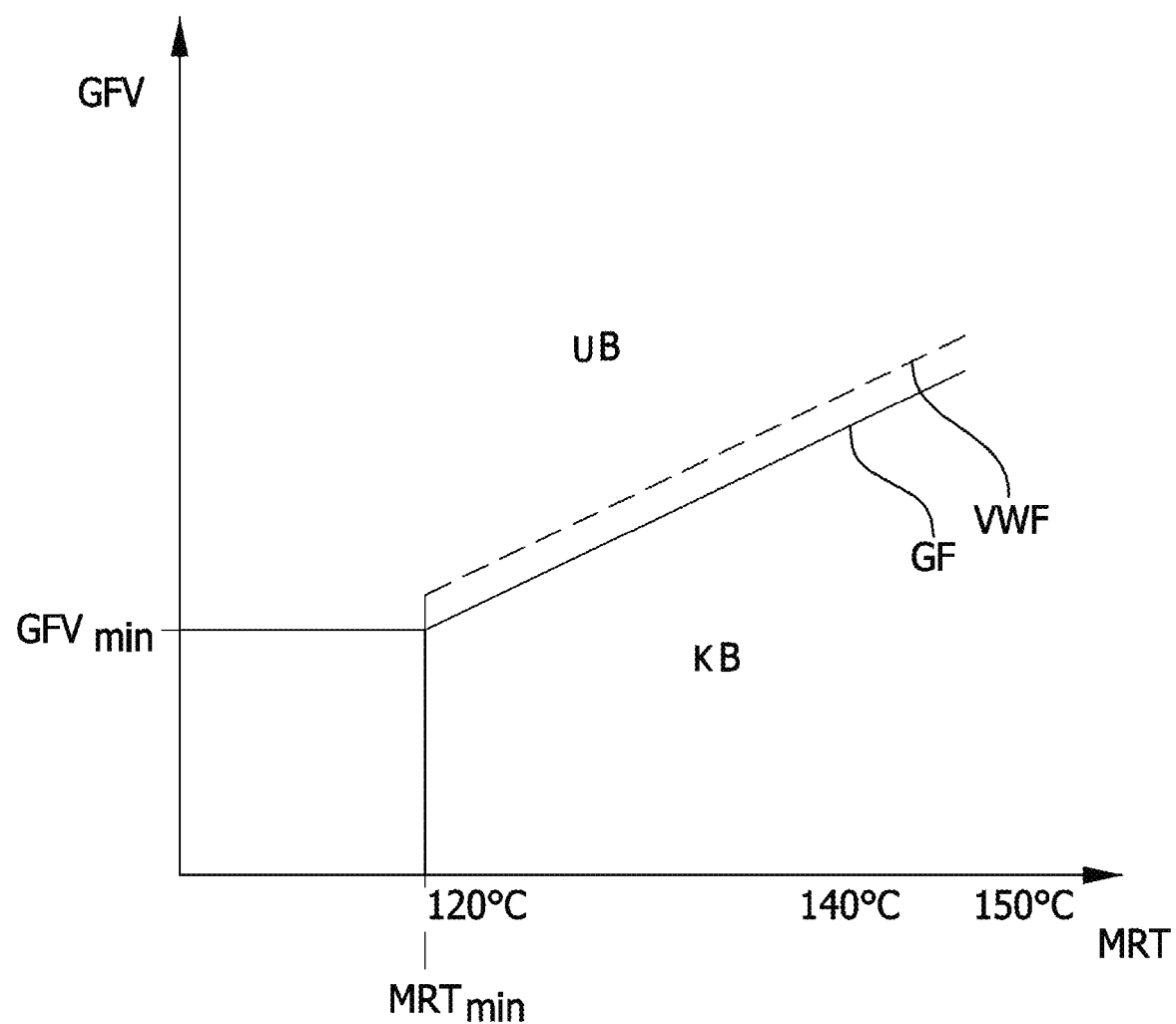
FIG. 8 is a representation of reference values specified by means of a limit function in the first exemplary embodiment for differentiating between non-critical and critical operating states.

If, for example, the refrigerant compressor 10 runs at a reduced delivery rate FV in a partial region, the delivery rate control system 130 acquires the operating state of the refrigerant compressor 10 by forming an operating state value group BZW on the basis, for example, of the compressor reference temperature RT and the delivery rate FV, and, in a comparison step 166, compares this operating state value group BZW with reference values GF stored, for example, in a memory store 154 of the delivery rate control system 130 in order to recognize possibly occurring critical operating states KB (FIG. 8).

In particular, the formation of the momentary values of the operating state value group BZW in that it is not a simple acquisition of the compressor reference temperature RT or the momentary delivery rate FV that takes place, but rather, in a mean value step 168 arranged before the comparison step 166, the delivery rate control system 130 ascertains a mean value MFV of the delivery rate FV over a defined acquisition period $t_1$, wherein the defined acquisition period $t_1$ is preferably a plurality of minutes, for example, within a range from one minute to 30 minutes (FIG. 7), and a mean value MRT over a defined acquisition period, preferably a plurality of minutes, wherein the acquisition period lies, in particular, within a range from 30 seconds to 15 minutes (FIG. 7).

This operating state value group BZW comprising the mean values MFV and MRT is compared in the comparison step 166 by the delivery rate control system 130 with reference values GF stored in the memory store 154 for critical KB and non-critical UB operating states (FIG. 8).

The reference values for non-critical UB and critical KB operating states defines, for example, a first version of a limit function GF stored in the memory store 154, which is relevant from a minimum mean compressor reference temperature $MRT_{min}$, since below the minimum mean compressor reference temperature $MRT_{min}$ there exist non-critical operating states in any event (FIG. 8).

In addition, the limit function GF is relevant, for example, from a minimum total delivery rate $GFVF_{min}$ provided the mean compressor reference temperature MRT is higher than $MRT_{min}$.

The limit function GF has been stipulated in this case so that, for example, at mean compressor reference temperatures MRT that are higher than the mean compressor reference temperature $MRT_{min}$, with increasing mean compressor reference temperature MRT, it requires increasingly larger mean total delivery rates GFV, wherein in the simplest case, the limit function GF represents a straight line with a specified slope.

The limit function GF can however also be a curved line, depending on which mean compressor reference temperatures MRT and which total delivery rates GFV lie in a critical or non-critical region UB.

For example, in a refrigerant compressor 10, the minimum mean compressor reference temperature $MRT_{min}$ is 120°, which means that up to the mean compressor reference temperature $MRT_{min}$, the refrigerant compressor 10 can be operated damage-free at the total delivery rate $GFV_{min}$ and any higher total delivery rate GFV (FIG. 8).

The limit function GF thus represents a boundary between the critical KB and non-critical UB operating states if the operating state value groups BZW have a value MRT based upon a compressor reference temperature RT that is higher than $MRT_{min}$, wherein the values of the total delivery rate GFV at critical operating states KB below or at non-critical operating states UB, lie above the values defined by the limit function GF.

If the delivery rate control system 130 determines in an evaluating step 172 that the operating state value group BZW has a value MRT, based upon the compressor reference temperature RT, which lies above the minimum mean compressor reference temperature $MRT_{min}$, in a first exemplary embodiment, in a setpoint value step 174, an ascertainment takes place of an internal delivery rate setpoint value IFVS which results from the following calculation, starting from the limit function GF, which has been determined such that it assigns as reference values, values of a total delivery rate GFV corresponding to different mean compressor reference temperatures MRT.

It is assumed that the value of the total delivery rate GFV corresponding to the mean compressor reference temperature MRT should be at least maintained.

Thereby, the value GFV is to correspond to a total delivery rate GFV that is achieved by averaging the delivery rate FV during an operating averaging period $t_1+t_2$, said period resulting firstly from the past acquisition period $t_1$ over which the delivery rate FV has been averaged during the calculation of the mean delivery rate MFV, and secondly from a future acquisition period $t_2$ over which an averaging of the future internal delivery rate setpoint value IFVS that is to be set is to take place, so that $$GFV \times (t_1+t_2) = MFV \times t_1 + IFVS \times t_2$$

Thus, for the delivery rate setpoint value that is to be ascertained $$IFVS = \frac{GFV \times (t_1 + t_2) - MFV \times t_1}{t_2}$$

This internal delivery rate setpoint value IFVS is transferred to a comparison step 176 in FIG. 7 which compares the internal delivery rate setpoint value IFVS with the external delivery rate setpoint value EFVS and then, if the external delivery rate setpoint value EFVS is smaller than the internal delivery rate setpoint value IFVS, transfers the latter to the control step 162 and then, if the internal delivery rate setpoint value IFVS is smaller than the external delivery rate setpoint value EFVS, transfers the latter to the control step 162.

It is thereby ensured that the total delivery rate GFV averaged over the operating averaging period $t_1+t_2$ does not undershoot the value for the total delivery rate specified by the limit function GF and thus on average, this value is not undershot at the mean compressor reference temperature MRT.

In a second exemplary embodiment, if the delivery rate control system 130 determines in the evaluating step 172 that the operating state value group BZW comprising the mean delivery rate MFV and the mean compressor reference temperature MRT has value pairings which (according to FIG. 10) have a mean compressor reference temperature MRT in the region of the limit function GF, that is, above the mean compressor reference temperature $MRT_{min}$ and a mean delivery rate MFV that lies above the corresponding value $GF_{MDT}$ of the limit function GF, the delivery rate control system 130 determines a non-critical operating state UB and a continuation of the operation with the externally specified delivery rate setpoint value EFVS (FIG. 9) and a renewed passage through the steps 162 to 168 takes place.

Figure 10:
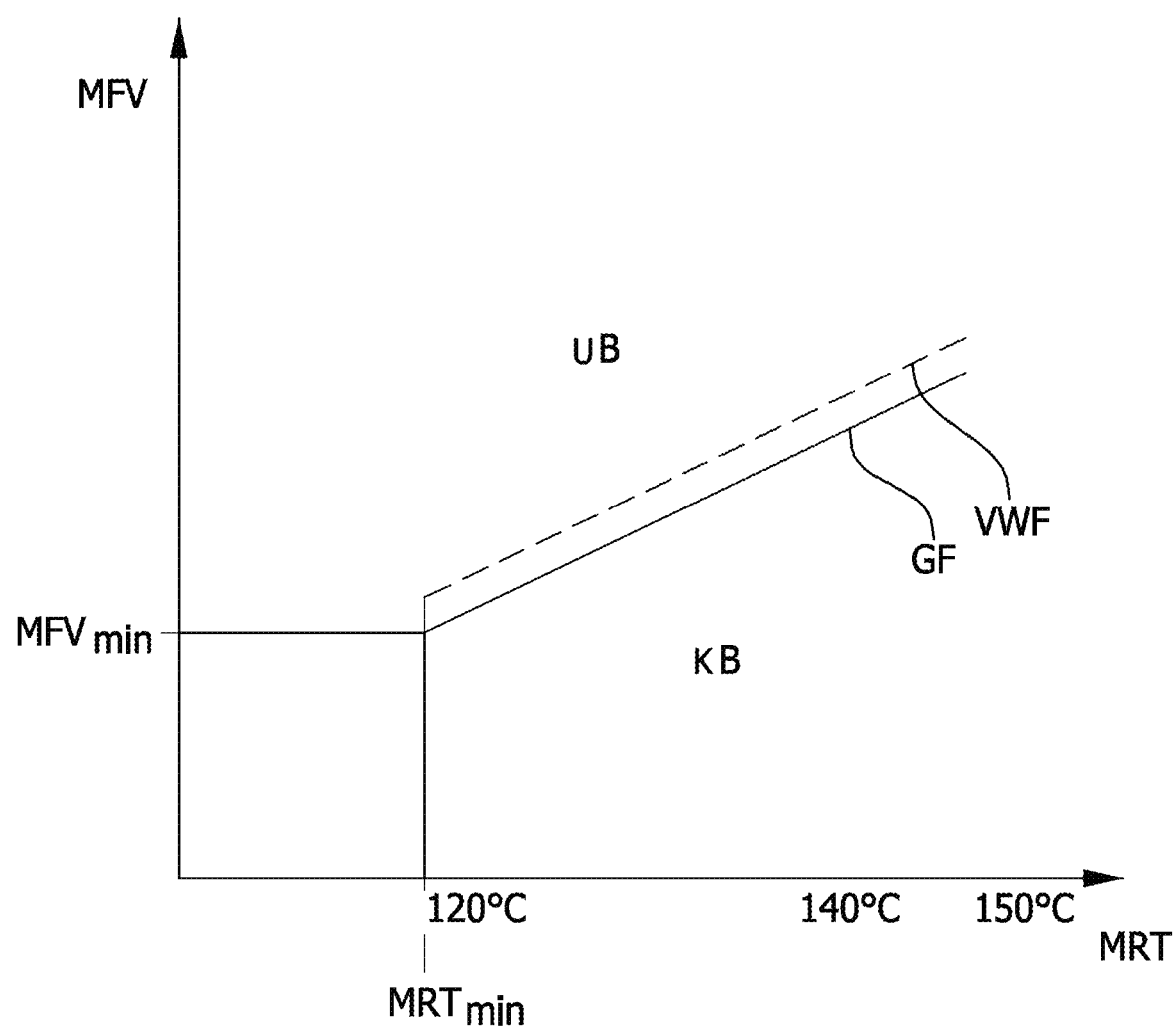
FIG. 10 is a representation similar to FIG. 8 of reference values specified by means of a limit function in the second exemplary embodiment.

If, however, the mean compressor reference temperature MRT at the operating state value group BZW lies above the mean compressor reference temperature $MDT_{min}$ and the mean delivery rate MFV lies below the value MFV(GF) of the limit function GF corresponding to the compressor reference temperature MRT for the mean delivery rate MFV, then the delivery rate control system 130 detects a critical operating state KB in the setpoint value step 174 (FIG. 10).

Figure 9:
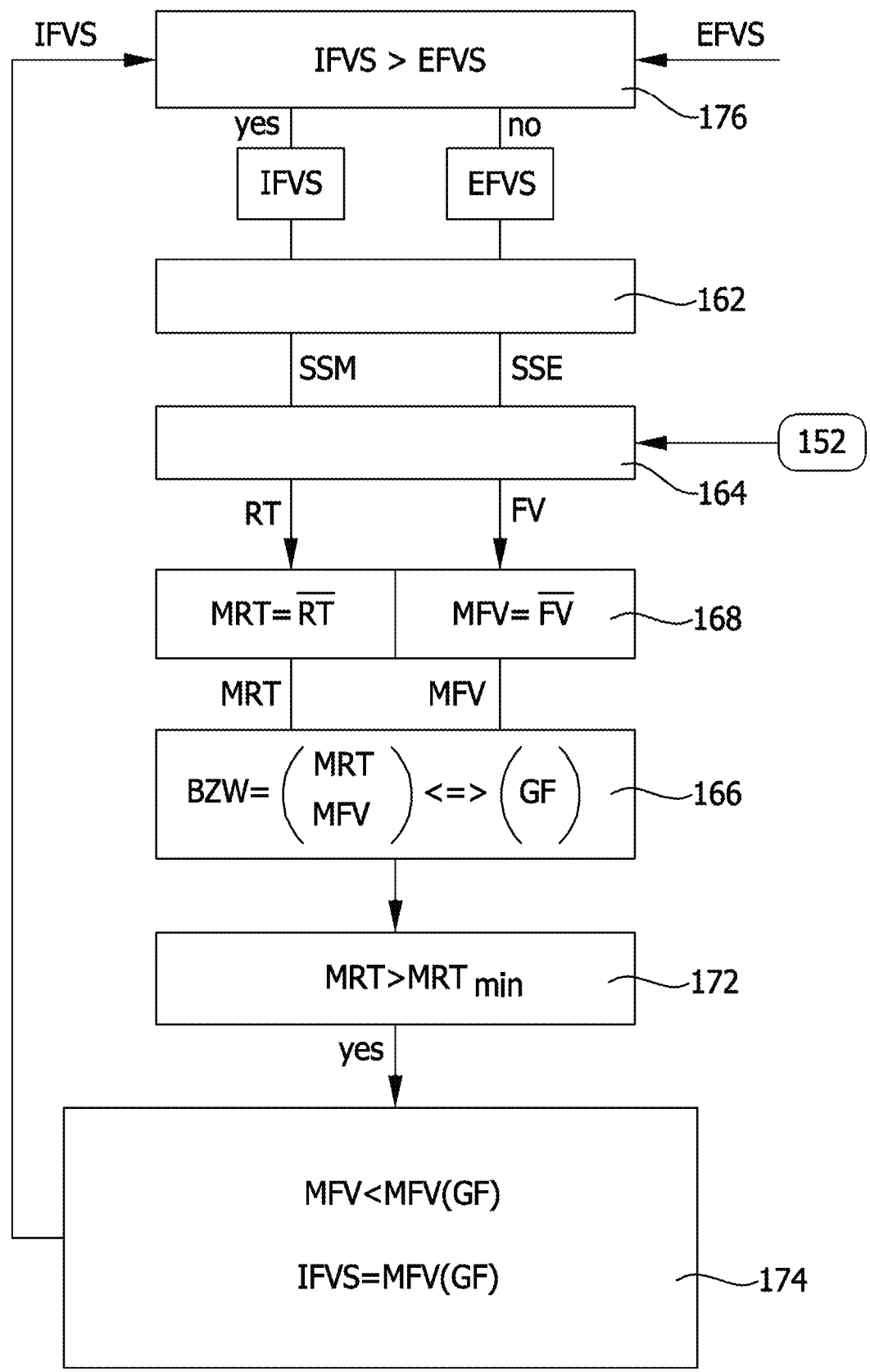
FIG. 9 is a flow diagram similar to FIG. 7 of a second exemplary embodiment.

The delivery rate control system 130 then ascertains in the setpoint value step 174, taking account of the limit function GF, an internal delivery rate setpoint value IFVS which corresponds to a mean delivery rate MFV (GF), which is specified by or lies above the limit function GF, so that a continuation of the operation of the refrigerant compressor 10 in the non-critical operating state UB or corresponding to the limit defined by the limit function GF between the non-critical operating state UB and the critical operating state KB takes place (FIG. 9).

Thus, in the second exemplary embodiment, the operating averaging period represents just the period $t_1$ that is used for the determination of the mean delivery rate MFV (GF).

This internal delivery rate setpoint value IFVS is then fed to the comparison step 176 of the delivery rate control system 130 shown in FIG. 9, which compares the internal delivery rate setpoint value IFVS with the external delivery rate setpoint value EFVS and feeds the larger value of the two to a control step 162 for controlling the delivery rate MFV of the refrigerant compressor 10, in particular, for controlling the mechanical control unit 70 by means of the control signals SSM and/or the electrical control unit 140 by means of the control signals SSE, so that thereby, a continuation of the operation of the refrigerant compressor 10 can take place without damage occurring.

Figure 11:
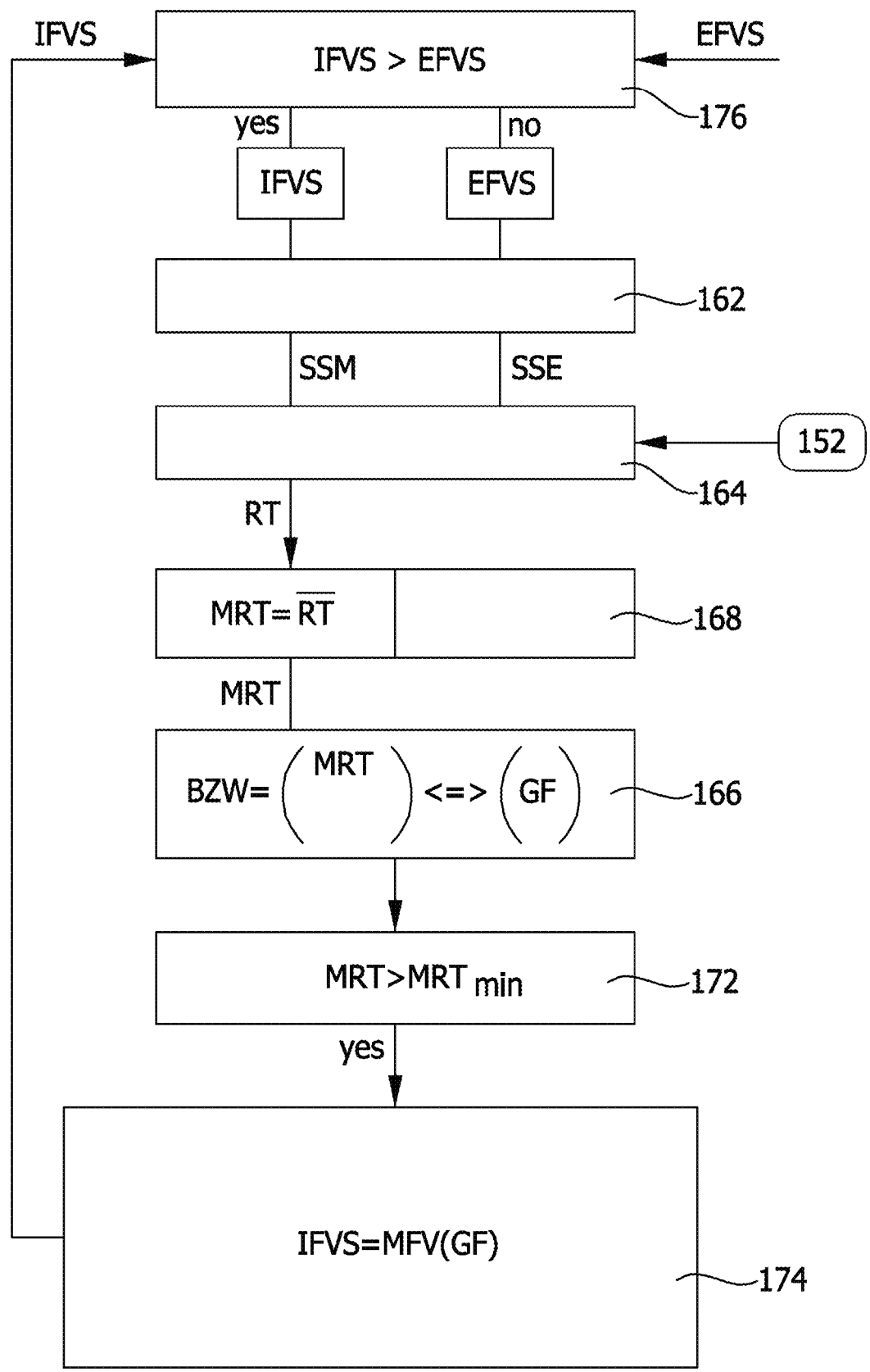
FIG. 11 is a flow diagram similar to FIG. 9 of a third exemplary embodiment.

A third exemplary embodiment, shown in FIG. 11, which is based upon the second exemplary embodiment, provides that the delivery rate control system 130 does not acquire the actual delivery rate FV, but only checks in the evaluating step 172 whether the operating state value group BZW has a value MRT based upon the compressor reference temperature RT which lies above the minimum compressor reference temperature $MRT_{min}$ and then if this is the case, without a comparison of the value of the operating state value group BZW on the basis of the delivery rate FV with the value MFV(GF) specified by the limit function GF for this compressor reference temperature MRT, uses the value MFV (GF) directly as the internal delivery rate setpoint value IFVS.

In all the exemplary embodiments, the delivery rate control system 130 always continues to operate with the internal delivery rate setpoint value IFVS if an external delivery rate setpoint value EFVS which is smaller than the internal delivery rate setpoint value IFVS is specified by the plant control system 138, so that thereby it is necessarily ensured that the refrigerant compressor 10 is operated with a mean total delivery rate GFV(GF) or delivery rate MFV (GF) which is larger at the existing mean compressor reference temperature MRT than the mean total delivery rate GFV(GF) or the mean delivery rate MFV(GF) required by the limit function GF or corresponds thereto, so that thereby an overheating of the refrigerant compressor 10 can be prevented (FIG. 10).

In all the exemplary embodiments, only if an external delivery rate setpoint value EFVS that is larger than the internal delivery rate setpoint value IFVS is specified by the plant control system 138, it is fed by the comparison step 176 to the control step 162 and used for controlling the delivery rate FV of the refrigerant compressor 10.

Such an external delivery rate setpoint value EFVS, if it is larger than the internal delivery rate setpoint value IFVS, will lead to the compressor reference temperature RT and thus also the mean compressor reference temperature MRT being further reduced during operation so that also thereafter an operation of the refrigerant compressor 10 with an operating state value group BZW at which the mean delivery rate MFV has smaller values is possible.

Due to the comparison step 176 provided and in cooperation with the control step 162, it is ensured that the delivery rate FV is always controlled on the basis of the largest of the two delivery rate setpoint values IFVS and EFVS, so that a long lasting overheating of the refrigerant compressor 10 can be prevented.

Figure 12:
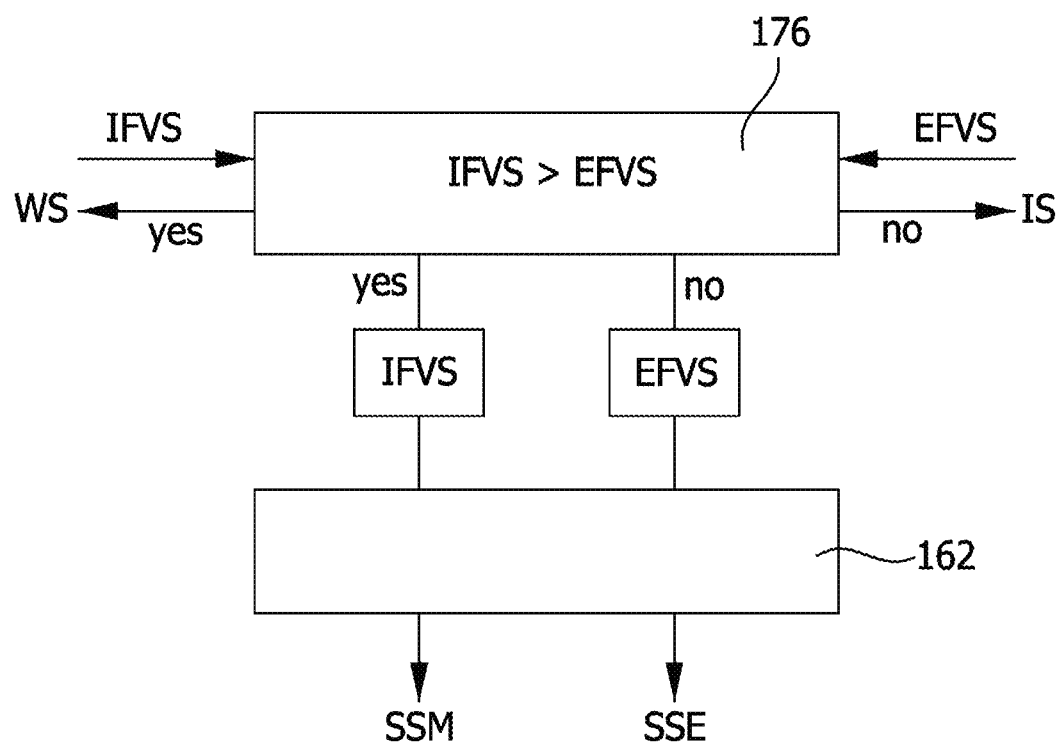
FIG. 12 is a portion of a flow diagram of a fourth exemplary embodiment.
Figure 13:
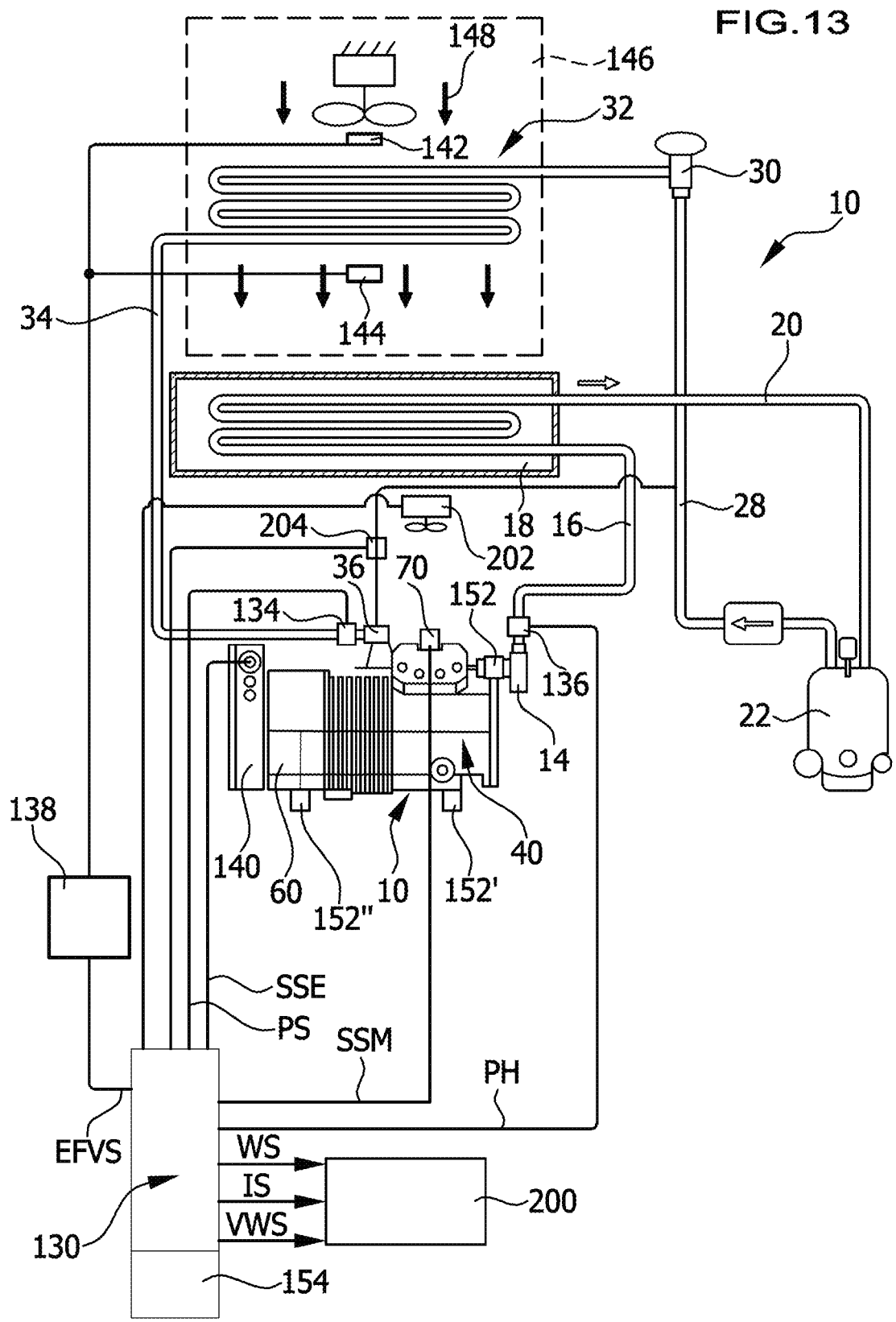
FIG. 13 is a schematic representation of the refrigeration plant similar to FIG. 1 comprising the variant according to the fourth and fifth embodiments.

In order to convey to the plant control system 138 or the plant operator that the refrigerant compressor 10 is controlled on the basis of the internal delivery rate setpoint value IFVS, since the external delivery rate setpoint value EFVS is smaller, in a fourth exemplary embodiment which represents a variant of the above exemplary embodiments, in the event that the internal delivery rate setpoint value IFVS is larger than the external delivery rate setpoint value EFVS, the comparison step 176 issues a warning signal WS which is output, for example, optically (FIG. 12 and FIG. 13).

Furthermore, the comparison step 176 issues an information signal IS which indicates that the external delivery rate setpoint value EFVS is larger than the internal delivery rate setpoint value IFVS so that thereby the plant operator or the plant control system 138 can recognize that the refrigerant compressor 10 is being operated with the external delivery rate setpoint value EFVS (FIG. 13).

Figure 14:
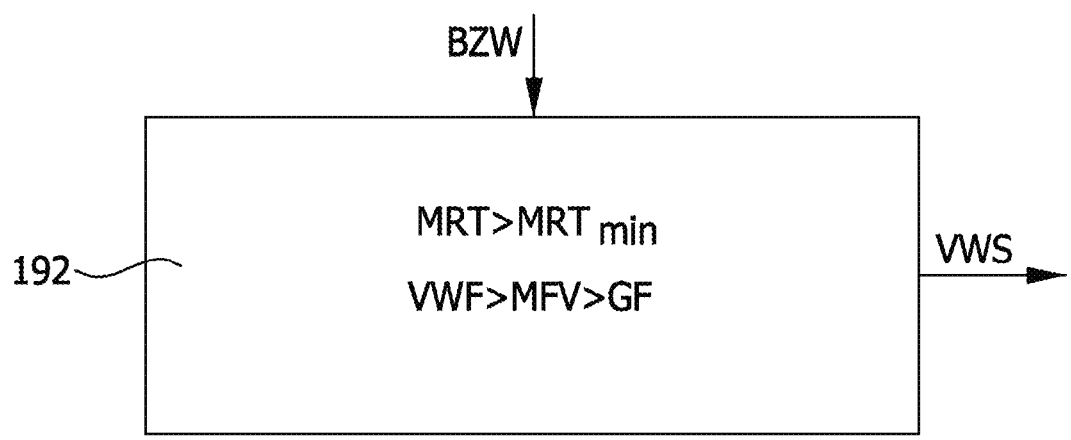
FIG. 14 is a portion of a flow diagram according to a fifth exemplary embodiment.

In addition, in a fifth exemplary embodiment which represents a further variant of the exemplary embodiments of the delivery rate control system 130 according to the invention, it is further provided that, as shown in FIG. 14, the operating state value group BZW generated in step 166 is fed to a comparison step 192 which compares the operating state value group BZW with values of an advance warning function VWF stored in the memory store 154, said advance warning function extending in the region of non-critical operating states, but close to the limit function GF so that at the respective mean compressor reference temperature MRT, when it is higher than the mean compressor reference temperature $MRT_{min}$ mean delivery rates MFV which lie in the region between the advance warning function VWF and the limit function GF are recognized.

By means of the comparison step 192, in this case, an advance warning signal VWS is generated and output which indicates either to the plant user or the plant control system 138 (FIG. 13) that there is an appreciable probability that the refrigerant compressor 10 can enter the critical region.

For example, the plant control system 138 can independently use this advance warning signal VWS to increase the delivery rate FV by raising the external delivery rate setpoint value EFVS.

In particular, the possibility thus exists, with the warning signal WS, the advance warning signal VWS and the information signal IS, of operating a display unit 200 (FIG. 13) which either represents just the warning signal WS, the advance warning signal VWS and the information signal IS through the display of different colors or the display unit 200 can be configured as a screen which, for example, enables the symbols or graphics associated with the warning signal WS, the advance warning signal VWS and the information signal IS to appear.

In addition or alternatively, for this purpose it is however also provided that in the event of partial load states of the refrigerant compressor 10 or at least at low partial load states or by acquiring the operating states, for example, triggered by the advance warning signal VWS, the delivery rate control system 130 uses a fan 202 for cooling the compressor unit 40 and/or an injection 204 (FIG. 13) for suction-side injection of liquid coolant, in order to prevent critical operating states KB.

The invention claimed is:

1. A refrigerant compressor for refrigeration plants, comprising:
 a compressor unit driven by a drive unit, wherein the compressor and drive units fare provided with a control unit which is controllable by means of a delivery rate control system in order to control the refrigerant compressor at different delivery rates, and wherein an external delivery rate setpoint value is communicated to the delivery rate control system;
 wherein the delivery rate control system is configured to acquire, by means of a sensor, a compressor reference temperature of the compressor unit, the delivery rate control system being configured to ascertain an operating state value group for acquisition of an operating state of the refrigerant compressor;
 wherein the delivery rate control system is configured to ascertain the operating state value group based upon both the acquired compressor reference temperature and the delivery rate;
 wherein the delivery rate control system uses specified reference values to differentiate between critical and non-critical operating states of the refrigerant compressor; and
 wherein, if at least one value of the ascertained operating state value group, based upon the compressor reference temperature, permits a critical operating state of the refrigerant compressor, the delivery rate control system specifies a delivery rate to operate the refrigerant compressor outside of the critical operating state.

2. The refrigerant compressor according to claim 1, wherein the delivery rate control system is configured to ascertain the values of the operating state value group of the refrigerant compressor, by ascertaining a mean value of the delivery rate over a defined acquisition period.

3. The refrigerant compressor according to claim 2, wherein the defined acquisition period is in the range from one minute to 30 minutes.

4. The refrigerant compressor according to claim 2, wherein the delivery rate control system is configured to ascertain the values of the operating state value group, by ascertaining a mean value of the compressor reference temperature over a defined acquisition period.

5. The refrigerant compressor according to claim 4, wherein the defined acquisition period ranges from 30 seconds to 15 minutes.

6. The refrigerant compressor according to claim 1, wherein the delivery rate control system is configured to determine the compressor reference temperature, based on at least one of a compressed gas temperature on the high pressure side of the compressor unit, an oil temperature of the compressor unit, and a temperature of the drive unit.

7. The refrigerant compressor according to claim 1, wherein the delivery rate control system is configured to determine values of the operating state value group by acquiring the delivery rate based upon control signals for at least one of the compressor and drive units.

8. The refrigerant compressor according to claim 1, wherein, during determination of the delivery rate, the delivery rate control system is configured to determine the delivery rate based on a value of the operating state value group in relation to reference values.

9. The refrigerant compressor according to claim 8, wherein the delivery rate control system is configured to compare the value of the operating state value group which is based upon an acquired delivery rate to the reference values.

10. The refrigerant compressor according to claim 9, wherein the delivery rate control system is configured to determine the delivery rate using at least one value for the delivery rate that is specified by means of the reference values, the at least one value corresponding to the operating state lying outside of any critical operating states.

11. The refrigerant compressor according to claim 2, wherein the delivery rate control system is configured to control the delivery rate such that an averaging of the delivery rate over an operating averaging period yields a total delivery rate that lies outside of any critical operating states.

12. The refrigerant compressor according to claim 8, wherein the reference values comprise at least one limit value for the delivery rate which defines a limit to any critical operating states.

13. The refrigerant compressor according to claim 12, wherein a limit function, representing reference values which defines a boundary between non-critical and critical operating states, is specified to the delivery rate control system.

14. The refrigerant compressor according to claim 13, wherein the delivery rate control system is configured to determine the delivery rate such that the delivery rate corresponds to at least a respective value of the limit function at a value of the operating state value group based upon the compressor reference temperature.

15. The refrigerant compressor according to claim 14, wherein the delivery rate control system is configured to determine the delivery rate such that an averaging of the delivery rate over an operating averaging period achieves at least the respective value of the limit function.

16. The refrigerant compressor according to claim 15, wherein the operating averaging period comprises an acquisition period for the value of the operating state value group, which value is based upon the delivery rate.

17. The refrigerant compressor according to claim 16, wherein the operating averaging period is greater than the acquisition period for the value of the operating state value group, which value is based upon the delivery rate.

18. The refrigerant compressor according to claim 15, wherein the operating averaging period also comprises a future period.

19. The refrigerant compressor according to claim 1, wherein the delivery rate control system is configured to determine the delivery rate by generating an internal delivery rate setpoint value used in determination of the delivery rate.

20. The refrigerant compressor according to claim 19, wherein the delivery rate control system is configured to generate the internal delivery rate setpoint value using the value for the delivery rate corresponding to the value based upon the compressor reference temperature and specified by a limit function.

21. The refrigerant compressor according to claim 19, wherein the delivery rate control system is configured to determine the internal delivery rate setpoint value by averaging over future delivery rates corresponding to the internal delivery rate setpoint value within an operating averaging period.

22. The refrigerant compressor according to claim 21, wherein the delivery rate control system is configured to determine the internal delivery rate setpoint value such that the future delivery rates corresponding thereto, in conjunction with the value of the operating state value group based upon the delivery rate, yield a mean total delivery rate which corresponds to a limit value, specified at a mean compressor reference temperature by a limit function, for the total delivery rate.

23. The refrigerant compressor according to claim 22, wherein the future delivery rates corresponding to the internal delivery rate setpoint value are averaged over a future acquisition period.

24. The refrigerant compressor according to claim 23, wherein an operating averaging period includes a past acquisition period for the value of the operating state value group based upon the delivery rate, and the future acquisition period for averaging the future delivery rates.

25. The refrigerant compressor according to claim 19, wherein the delivery rate control system is configured to determine the delivery rate using the internally ascertained delivery rate setpoint value when an externally specified delivery rate setpoint value lies below the internally ascertained delivery rate setpoint value.

26. The refrigerant compressor according to claim 25, wherein the delivery rate control system is configured to compare the internally ascertained delivery rate setpoint value to the externally specified delivery rate setpoint value and use the larger of the two delivery rate setpoint values to control the delivery rate.

27. The refrigerant compressor according to claim 1, wherein the delivery rate control system is configured to generate a signal if the refrigerant compressor is operated with an internally ascertained delivery rate setpoint value.

28. The refrigerant compressor according to claim 1, wherein the delivery rate control system is configured to generate an information signal if the delivery rate is determined by the external delivery rate setpoint value.

29. The refrigerant compressor according to claim 13, wherein an advance warning range, in which non-critical operating states exist which adjoin the specified limit function, is specified to the delivery rate control system.

30. The refrigerant compressor according to claim 29, wherein the delivery rate control system is configured to generate an advance warning signal if operating state value groups that lie within the advance warning range are recognized.

31. The refrigerant compressor according to claim 1, wherein the delivery rate control system is configured to drive a fan and/or a refrigerant injection device for cooling the refrigerant compressor.

* * * * *

UNITED STATES PATENT AND TRADEMARK OFFICE
CERTIFICATE OF CORRECTION

PATENT NO. : 11,988,429 B2
APPLICATION NO. : 17/372072
DATED : May 21, 2024
INVENTOR(S) : Jens Mannewitz et al.

It is certified that error appears in the above-identified patent and that said Letters Patent is hereby corrected as shown below:

In the Claims

Claim 1, Line 42 reads, "compressor and drive units fare provided with a control"
Should read, --compressor and drive units are provided with a control--

Signed and Sealed this
Twenty-third Day of July, 2024

Katherine Kelly Vidal
*Director of the United States Patent and Trademark Office*